No. 755,390. PATENTED MAR. 22, 1904.
G. REYNAUD.
MANUFACTURE OF DEXTRIN.
APPLICATION FILED SEPT. 10, 1902.
NO MODEL.
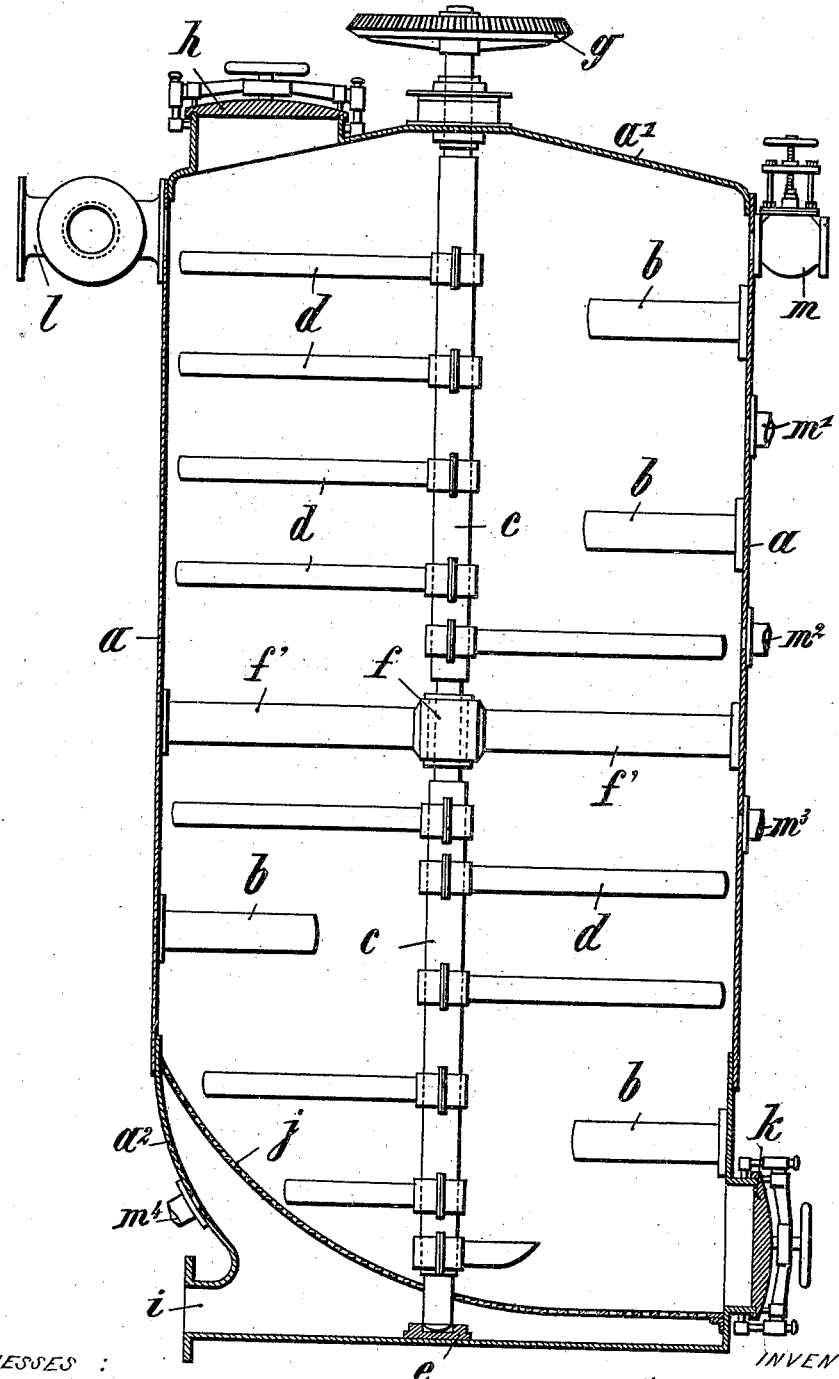
WITNESSES:
W. M. Avery
Theo. G. Hoskin
INVENTOR
Georges Reynaud
BY
Munder
ATTORNEYS.

No. 755,390. Patented March 22, 1904.

UNITED STATES PATENT OFFICE.

GEORGES REYNAUD, OF PARIS, FRANCE.

MANUFACTURE OF DEXTRIN.

SPECIFICATION forming part of Letters Patent No. 755,390, dated March 22, 1904.

Application filed September 10, 1902. Serial No. 122,817. (No specimens.)

*To all whom it may concern:*

Be it known that I, GEORGES REYNAUD, engineer, of 5 Rue Salneuve, in the city of Paris, Republic of France, have invented Improvements Relating to the Manufacture of Dextrin, (Achroodextrin,) of which the following is a full, clear, and exact description.

This invention relates to a process for the treatment of peat for the purpose of manufacturing industrially and under specially economical conditions dextrin, (achroodextrin.)

My process consists, essentially, in diluting the material to be treated in twice its weight of water and in heating the resultant mass under pressure in an autoclave or digester at a temperature of 160° to 220° centigrade for about an hour and a half. Under the influence of this temperature the cellulose and the amylaceous matters of the peat under treatment become converted into dextrin or, more exactly, achroodextrin, which is capable of advantageously replacing ordinary dextrin in its industrial applications by reason of its lower density.

Hitherto achroodextrin has only been a laboratory product, because the processes employed for the manufacture of dextrin always give ordinary or erythro dextrin. My process, on the contrary, permits of obtaining achroodextrin industrially and directly.

This process does not necessitate the presence of any acid or other auxiliary substance. It is extremely economical and, furthermore, obviates the defects invariably inherent in the employment of acids. The manipulation is convenient and presents no danger, while no special construction is requisite for the apparatus, the maintenance of which is far less costly.

In the application of my said process I may employ any kind of autoclave or digester apparatus; but I prefer to operate with an apparatus constituted in the manner of that represented, by way of example, in the accompanying drawing. This apparatus consists of a cylindrical vessel $a$, provided upon its inner wall with fixed pallets or blades $b$ and traversed along its longitudinal axis by a shaft $c$, upon which are mounted blades $d$. This shaft rotates at its lower portion in a step-bearing $e$, is maintained at its middle portion by a collar $f$, carried by the arms $f'$, traverses the upper end $a'$ of the vessel, and carries at this extremity a gear-wheel $g$, by means of which a movement of rotation is imparted to it. The material to be treated is introduced into the apparatus through the manhole $h$, formed in the upper end or cover $a'$. In order to facilitate the washing, draining, and cleaning, the cylindrical vessel is provided with a rounded portion $a^2$, as shown in the drawing, and with a tube $i$, through which the solution obtained passes out. Above this bottom $a^2$ the apparatus comprises a sieve $j$, which is also of rounded form and which serves to separate from the solution impurities and earthy matters, which are withdrawn from the apparatus through the manhole $k$. The apparatus is provided at its upper portion with a pipe $l$, through which the water enters, and is also provided at various levels with inlets $m$ $m'$ to $m^4$, through which enters the superheated steam, serving to raise the material to be treated to the desired temperature. Each of the inlets is to be provided with a tap; but only one is so shown in the drawing.

The process is carried out in the following manner: A certain quantity of peat is introduced into the apparatus $a$ through the charging-aperture $h$, the acidity or alkaline condition of the substance being immaterial. A quantity of water equal to twice the weight of the material to be treated is then added. The apparatus being closed, the shaft $c$ is caused to rotate in such a manner that the blades $d$ in rotating agitate the material and intimately mix it with the water. When this has been effected and while the agitator continues to rotate, the inlet $m$ is opened (or one of the valves $m'$ $m^2$ $m^3$) in such a manner as to admit the steam under pressure into the vessel $a$, so as to raise the mass to a temperature of 160° to 220° centigrade. The operation lasts for about one hour and a half. As previously stated, the cellulose and amylaceous matters of the peat become converted at this temperature into achroodextrin. The aqueous solution withdrawn from the apparatus $a$ may then be employed directly for the industrial exploitation of this achroodextrin, or it may be submitted to a second operation for the purpose of converting it into alcohol. In this latter case there is added to the aqueous solution containing the achroodextrin and brought to a temperature of about 55° centigrade a diastase or pancreatic juice, according to the known process, in order to produce saccharification, which is completed in about three hours. As an example of the diastase germinated malt in the quantity of about one-third, by weight, of the achroodextrin contained in the liquid may be used. When this saccharification is completed, the liquid is caused to ferment by the ordinary means in employing yeast, care being had to add two to three per cent. of acid. When the fermentation is terminated, the liquid may be submitted to distillation. Instead of adding this small quantity of acid (from two to three per cent.) at the moment of fermentation only it may be introduced into the autoclave $a$ at the commencement of operations. This proportion of acid should not be exceeded in order that it may be possible to saccharify later by means of diastase.

My process by reason of its simplicity thus permits of manufacturing industrially and under especially economical conditions achroodextrin, which is preferable to ordinary dextrin, as previously stated, owing to its lower density, for example. In addition to this in my process as applied to the manufacture of alcohol the solution of dextrin not being acid need not be neutralized, and, as above specified, the saccharification may be obtained by means of diastase. This results in a double economy.

It will of course be understood that I may employ any suitable form of apparatus—for example, a single apparatus or several appliances connected so as to form a battery—and that any convenient method of heating may be adopted for industrial purposes.

I claim—

The herein-described process for treating peat for the industrial manufacture of dextrin (achroo dextrin), consisting in mixing the material in water of about twice the weight of the material, and heating the resultant mass under pressure in a digester to a temperature of about 160° to 220° centigrade during about two hours to convert the cellulose of this peat into achroodextrin.

The foregoing specification of my improvements relating to the manufacture of dextrin (achroodextrin) and alcohol signed by me this 28th day of August, 1902.

GEORGES REYNAUD.

Witnesses:
EDWARD P. MACLEAN,
MAURICE H. PIGNET.